United States Patent
Bannenberg et al.

(10) Patent No.: US 12,291,221 B2
(45) Date of Patent: May 6, 2025

(54) COMPUTER-IMPLEMENTED METHOD FOR TERMINATING A SCENARIO-BASED TEST PROCESS OF A DRIVING ASSISTANCE SYSTEM

(71) Applicant: dSPACE GmbH, Paderborn (DE)

(72) Inventors: Sebastian Bannenberg, Paderborn (DE); Rainer Rasche, Paderborn (DE); Konstantin Sonntag, Salzkotten (DE); Sebastian Peitz, Schloss Holte-Stukenbrock (DE)

(73) Assignee: DSPACE GMBH, Paderborn (DE)

(*) Notice: Subject to any disclaimer, the term of this patent is extended or adjusted under 35 U.S.C. 154(b) by 201 days.

(21) Appl. No.: 18/004,071

(22) PCT Filed: Jul. 26, 2021

(86) PCT No.: PCT/EP2021/070809
§ 371 (c)(1),
(2) Date: Jan. 3, 2023

(87) PCT Pub. No.: WO2022/028934
PCT Pub. Date: Feb. 10, 2022

(65) Prior Publication Data
US 2024/0010210 A1    Jan. 11, 2024

(30) Foreign Application Priority Data
Aug. 4, 2020 (DE) .................... 10 2020 120 500.7

(51) Int. Cl.
*B60W 50/02* (2012.01)
*B60W 50/023* (2012.01)

(52) U.S. Cl.
CPC .... *B60W 50/0225* (2013.01); *B60W 50/0205* (2013.01); *B60W 50/023* (2013.01)

(58) Field of Classification Search
CPC ......... B60W 50/0225; B60W 50/0205; B60W 50/023; G06F 11/3688
See application file for complete search history.

(56) References Cited

U.S. PATENT DOCUMENTS 10,223,479 B1 * 3/2019 Konrardy ............... G05B 15/02

FOREIGN PATENT DOCUMENTS

DE    102017200180 A1    7/2018

OTHER PUBLICATIONS

Wikipedia entry for "Predictive engineering analytics" Dec. 28, 2016 downloaded from the Wayback Machine Oct. 17, 2024 (Year: 2016).*

(Continued)

*Primary Examiner* — Michael V Kerrigan
*Assistant Examiner* — Tanya C Sienko
(74) *Attorney, Agent, or Firm* — LEYDIG, VOIT & MAYER, LTD.

(57) ABSTRACT

A computer-implemented method provides for terminating a scenario-based test process of a driver assistance system. The test process comprises a cycle and includes determining critical test cases and parameter combinations thereof. The method includes: performing at least one test of the driver assistance system after each iteration n of the cycle and determining a set of critical test cases; establishing, on that basis, a distance between a first set of critical test cases in the iteration n and a second set of critical test cases from the iteration n−1 or a distance between the first set of critical test cases in the iteration n and a predefined set of critical test cases; and terminating or continuing the cycle of the test process on the basis of a difference between the distance between the first set and the second set and a preset limit.

14 Claims, 5 Drawing Sheets

EBV  surrogate model generation method
EBMV  method
D  design phase
M  model generation phase
EM  surrogate model
TP  test process
T  test
Krit_TF  critical test cases
Z  cycle
Ter  termination
AM  distance metric (56) References Cited

OTHER PUBLICATIONS

Wikipedia entry for "Hausdorff distance" Jan. 16, 2020 downloaded from the Wayback Machine Oct. 17, 2024. (Year: 2020).*

"CMTS: Conditional Multiple Trajectory Synthesizer for Generating Safety-critical Driving Scenarios" by W. Ding et al., arXiv 1910.00099v2 Oct. 2, 2019, also published 2020 IEEE International Conference on Robotics and Automation (ICRA) May 31-Aug. 31, 2020. (Year: 2019).*

"Argoverse: 3D Tracking and Forecasting with Rich Maps" by M.Chang et al., 2019 IEEE/CVF Conference on Computer Vision and Pattern Recognition (CVPR) (Year: 2019).*

"SUrrogate MOdeling (SUMO) Toolbox" (web page sumowiki.intex.ugent.be/Main_Page) (last edited on May 7, 2013) (Year: 2013).*

"Fuzzy local linear approximation-based sequential design" by J. van der Herten et al., 2014 IEEE Symposium on Computational Intelligence for Engineering Solutions (CIES) (2014, pp. 17-21) (Year: 2014).*

\* cited by examiner

EBV surrogate model generation method

D        design phase
M        model generation phase
Z        cycle TP       test process
T        test
Krit_TF  critical test cases

Fig. 6

EBV  surrogate model generation method

EBMV   method
D      design phase
M      model generation phase
EM     surrogate model TP     test process
T      test
Krit_TF  critical test cases Z      cycle Ter    termination
AM     distance metric

Fig. 7

COMPUTER-IMPLEMENTED METHOD FOR TERMINATING A SCENARIO-BASED TEST PROCESS OF A DRIVING ASSISTANCE SYSTEM

CROSS-REFERENCE TO PRIOR APPLICATIONS

This application is a U.S. National Phase application under 35 U.S.C. § 371 of International Application No. PCT/EP2021/070809, filed on Jul. 26, 2021, and claims benefit to German Patent Application No. DE 10 2020 120 500.7, filed on Aug. 4, 2020. The International Application was published in German on Feb. 10, 2022 as WO 2022/028934 A2 under PCT Article 21(2).

FIELD

The invention relates to a computer-implemented method for terminating a scenario-based test process of a driver assistance system.

BACKGROUND

Driver assistance systems such as adaptive cruise control and/or functions for highly automated driving can be verified or validated using various test methods. In the process, hardware-in-the-loop methods, software-in-the-loop methods, simulations, and/or test trips can be used in particular.

The effort required, in particular the time spent and/or costs involved, for testing these kinds of vehicle functions using the aforementioned test methods is typically very high since a large number of possible driving situations potentially have to be tested.

This may in particular lead to high costs for both test trips and simulations DE 10 2017 200 180 A1 describes a method for verifying and/or validating a vehicle function provided for autonomously driving a vehicle in the longitudinal and/or transverse direction. The method comprises establishing a test control instruction to an actuator of the vehicle on the basis of surroundings data related to the surroundings of the vehicle, in order to implement a vehicle function, the test control instruction not being implemented by the actuator. The method further comprises simulating, on the basis of data on the surroundings and by using a road user model related to at least one road user in the surroundings of the vehicle, a fictitious traffic situation that would apply if the test control instruction had been implemented. The method additionally comprises providing test data related to the fictitious traffic situation. In this case, in order to establish the test control instruction, the vehicle function is operated passively in the vehicle. The drawback of this method is that, for the vehicle function to be verified and/or validated, the vehicle actually has to be operated so that the required data can be established.

SUMMARY

In an exemplary embodiment, the present invention provides a computer-implemented method for terminating a scenario-based test process of a driver assistance system. Critical test cases are indicated by parameter combinations of specific driving situation parameters spanning a metric parameter space. The parameter combinations lead to critical driving situations. The test process comprises a cycle and includes determining critical test cases and parameter combinations thereof. A distance metric is used as a cycle abort condition. The method includes: performing at least one test of the driver assistance system after each iteration n of the cycle and determining a set of critical test cases; establishing, on that basis, a distance between a first set of critical test cases in the iteration n and a second set of critical test cases from the iteration n−1 or a distance between the first set of critical test cases in the iteration n and a predefined set of critical test cases; and terminating or continuing the cycle of the test process on the basis of a difference between the distance between the first set and the second set and a preset limit.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Exemplary embodiments of the invention provide for improvements over existing methods and testing devices so that so-called 'critical test cases' for systems and system components in highly automated driving can be established efficiently and efficient test procedures can be specified on that basis.

Exemplary embodiments of the invention provide a computer-implemented method for terminating a scenario-based test process of a driver assistance system, by a computer program, and by a computer-readable storage medium.

The invention relates to a method for terminating a scenario-based test process of a driver assistance system, critical test cases being indicated by parameter combinations of specific driving situation parameters spanning a metric parameter space, said parameter combinations leading to critical driving situations, for example a vehicle collision or near-collision. The method further comprises a cyclical test process that includes determining critical test cases, and a distance metric is used for termination, i.e., as an abort condition of the cycle. The method includes the following steps:

performing at least one test of the driver assistance system after each iteration n of the cycle and determining a set of critical test cases, establishing, on that basis, a distance in the parameter space between a first set of critical test cases in the iteration n and a second set of critical test cases from the iteration n−1 or a predefined set of critical test cases, and terminating or continuing the cycle of the test process on the basis of the difference between the distance in the metric space between the first set and the second set and a preset limit, such that the test process is cyclically repeated.

In scenario-based testing of systems and system components for driving a motor vehicle autonomously, scenarios are defined, which can be referred to as an abstraction of a traffic situation. In this context, a logical scenario is the abstraction of a traffic situation including the road, driving behavior, and the surrounding traffic, without any concrete parameter values.

When concrete parameter values are selected, the logical scenario becomes a concrete scenario. Each concrete scenario of this kind corresponds to a specific traffic situation.

One traffic situation or scenario of this kind is the "cutting-off" scenario. A cutting-off scenario can refer to a traffic situation in which a highly automated or autonomous vehicle is driving in a predetermined lane and another vehicle traveling at a slower speed than the ego vehicle veers into the lane of the ego vehicle from a different lane at a particular distance from said vehicle. Here, the ego vehicle denotes the vehicle to be tested.

To begin with, the speeds of the ego vehicle and the other vehicle, which is also referred to as the fellow vehicle, are constant in this case. Since the speed of the ego vehicle is higher than that of the fellow, the ego vehicle has to be braked in order to prevent the two vehicles from colliding.

In this case, a parameter set of a scenario may include scenery parameters and driving situation parameters, all the parameters having a predetermined definition range.

By way of example, roads having different lane markings, different terrains, intersections, bends, and road restrictions may all pose a challenge in the context of scenery parameters. In addition, driving situation parameters may be determined by the number and type of road users. Driving situation parameters thus reflect moving objects in the scenario, such as the number of road users, the type of road users, the number of lane changes and/or maneuvers carried out by the road users.

The test process according to the method includes an expanded surrogate model generation method so that an approximation of the scenario being described can be specified efficiently. The expanded surrogate model generation method comprises a cycle composed of at least a design phase, a model generation phase, and a test phase, including the determination of critical test cases. According to the invention, a distance metric is determined after each cycle. According to the invention, therefore, termination of the surrogate model generation, i.e., of the cycle, is controlled by defining a predetermined limit or threshold value.

Owing to the high number of simulation evaluations, identifying critical test cases is time-consuming in other methods. At this juncture, surrogate models (also referred to as "substitution models") can be used to speed up the test process, as disclosed by the method according to the invention. Surrogate models are simplified mathematical functions that predict the rating of a simulated test trip for at least one specific parameter set. In general, fewer simulations are needed to create a surrogate model than to identify critical test cases using other methods. If no simulations are subsequently carried out when identifying critical test cases and the predictions of the surrogate model are used instead, time can be saved in the test process.

To generate the surrogate model, the method according to the invention initially runs through a design phase and a model generation phase. The surrogate model generation method is determined by a design and a modeling method.

The set $S \subseteq X$ of points from the definition range for which evaluations are carried out is referred to as the design. The elements $s \in S$ are design points. The values $f(s) \in Y$ are the associated evaluations of the computer model. The term 'computer model' is used since the functions under examination cannot be written as a simple formula during surrogate model generation, and a computer is needed in order to determine an output efficiently. The evaluation of computer models is also referred to as a simulation.

A design may be created either sequentially or non-sequentially.

In a non-sequential design, the design points are selected in one step. A design is sequential when the design points are selected successively. In doing so, just one or a plurality of new design points may be selected in each step. Sequential methods require a non-sequential starting design. This serves as a starting position from which to select new design points.

In sequential designs, abort conditions, which prevent too many design points from being evaluated, may be formulated. This is an advantage since computer models, i.e., simulations, have long evaluation periods. If no more evaluations are carried out than are necessary, this speeds up the generation of the surrogate model. In addition, the increment between the steps or iterations for selecting new design points can be varied.

One example of a design method is the Voronoi design. This is a sequential design and requires a starting design in order to select new points. It is a sequential, space-filling design, so areas in which few points are distributed have to be identified. These areas are depicted using the eponymous Voronoi diagram. A Voronoi diagram is a partition of the space into regions, which are defined by a predetermined set of points in the space (referred to as seeds in this case). Each region is defined by precisely one seed and encompasses all the points in the space that are located closer to the seed of the region than to any other seed on the basis of the Euclidean metric.

The LOLA-Voronoi design is an expansion of the Voronoi design. The LOLA-Voronoi design is sequential and requires a starting design. The design uses two ratings of the previous design points in order to identify areas in which new design points are selected: one rating for the exploration and one rating for the exploitation.

The rating for the exploration is implemented by the aforementioned Voronoi design.

The LOLA algorithm is used for the exploitation. LOLA stands for local linear approximation. The LOLA algorithm selects new design points at sites at which the system diverges the most from a local linear approximation.

In the LOLA-Voronoi algorithm, the surroundings of all the points are internally rated on the basis of said two criteria. A high rating means that there are few points in the surroundings or that the system is behaving in a highly non-linear manner therein. In these areas, new points are selected in the next step.

It will be appreciated that there are many other methods besides the example design phase method set forth here that are encompassed by exemplary embodiments according to the invention.

Model generation methods generate a surrogate model from an available design and the associated evaluations of the computer model/simulation.

One example model generation method is the radial basis function. In modeling using radial basis functions, the surrogate model includes a linear combination of basis functions. If the design has n points with evaluations/simulations, the linear combination includes n basis functions. Radial basis functions are often used to model computer models.

It will be appreciated that various methods for the model generation are also encompassed by exemplary embodiments according to the invention.

By using the surrogate model, test results can be approximated and, in particular, critical test cases can also be determined.

In scenario-based testing of autonomous driving functions, detecting critical test cases is vital. Simulating virtual test trips can take lots of time and computing power. As a result, it is very important to locate the critical test cases as precisely as possible while carrying out as few simulations as possible. The surrogate model generation according to the invention can be used in this context.

In order for the cyclical test process, which includes a design phase, a model generation phase, and a test phase, including the determination of critical test cases, to be terminated as efficiently as possible, an abort condition is needed. A great advantage of sequential designs is that abort conditions can be formulated. According to the invention, the Hausdorff distance between the sets of critical test cases, acting as the distance metric, can be used as the abort condition.

In a scenario-based test process of a driver assistance system, critical test cases are indicated by parameter combinations of specific driving situation parameters spanning a metric parameter space, said parameter combinations leading to critical driving situations, for example a vehicle collision or near-collision. Therefore, it is relevant to identify precisely these parameter combinations and integrate them into the generation of a surrogate model.

Using the Hausdorff distance, a distance in the parameter space between a first set of critical test cases in the iteration n and a second set of critical test cases from the iteration n−1 or a predefined set of critical test cases is established, and the cycle of the test process is terminated or continued on the basis of the difference between the distance in the metric space between the first set and the second set and a preset limit.

For the Hausdorff distance, where (M, d) is a metric space and A, B∈M are non-empty compact subsets, then the Hausdorff distance between A and B is:

$$\delta(A,B)=\{\max\{D(a,B)|a\in A\},\max\{D(A,b)|b\in B\}\}$$

In a surrogate model generation method using a sequential design, a better surrogate model is generated as the number of design points increases, so critical test cases can be approximated more effectively using the surrogate model. When a Hausdorff distance between the set of critical test cases in the current iteration and the set of critical test cases from the previous iteration is small, there are enough design points available while a good approximation of critical test cases is still achieved.

Owing to the method according to the invention, therefore, when a distance metric, in particular the Hausdorff distance, between the sets of critical test cases under observation is consistently small over a plurality of cycles, a better quality of the surrogate model can be noted.

Various rating functions of highly automated vehicles can be used as the basis for approximating critical test cases.

According to a further aspect of the invention, the method furthermore involves the rating function being a target safety function having a numerical value that has a minimum value when a distance between the motor vehicle and the other motor vehicle is $\geq V_{FELLOW}\times 0.55$ (time unit), has a maximum value in the event of a collision between the motor vehicle and the other motor vehicle, and has a numerical value that is greater than the minimum value when a distance between the motor vehicle and the other motor vehicle is $\leq V_{FELLOW}\times 0.55$ (time unit).

The target safety function indicates how safe the traffic situation is for the ego vehicle. It is specified as follows: if the distance between the ego vehicle and the fellow vehicle is always greater than or equal to the safety distance, then the functional value of the target safety function is 0.

The safety distance can be defined as a distance at which, on the basis of a speed difference between the ego vehicle and the fellow vehicle and the distance between the ego vehicle and the fellow vehicle, the ego vehicle can always be safely braked without colliding with the fellow vehicle.

In the present example, a distance of this kind is defined by a value in meters, corresponding to the speed $V_{FELLOW}\times 0.55$.

The target functional value gets closer to the value 1 as the distance between the ego vehicle and the fellow vehicle decreases, or as soon as the distance falls below the safety distance. If the ego vehicle and the fellow vehicle collide, the distance between the ego vehicle and the fellow vehicle is thus less than or equal to zero, and the target functional value is 1.

According to a further aspect of the invention, the method according to the invention furthermore involves the rating function being a target comfort function or a target energy consumption function having a numerical value that has a minimum value when there is no change in the acceleration of the motor vehicle, has a maximum value in the event of a collision between the motor vehicle and the other motor vehicle, and has a numerical value between the minimum value and the maximum value if the acceleration of the motor vehicle changes, based on the magnitude of the acceleration change.

Using the target comfort function, conclusions can be drawn as to how comfortable a driving maneuver is for the driver of the ego vehicle. Sharp acceleration or braking and frequent repetition of these operations is not considered comfortable.

The changes in acceleration are referred to as jerk. The lower the calculated value of the target comfort function, the more comfortable the driving situation.

In another rating function, the fuel consumption in the event of a collision between the ego vehicle and fellow vehicle is 1, i.e., the fuel consumption is set at a fixed maximum value. The reason for this is that the contents of a vehicle tank can no longer be used after an accident.

Figure 1:
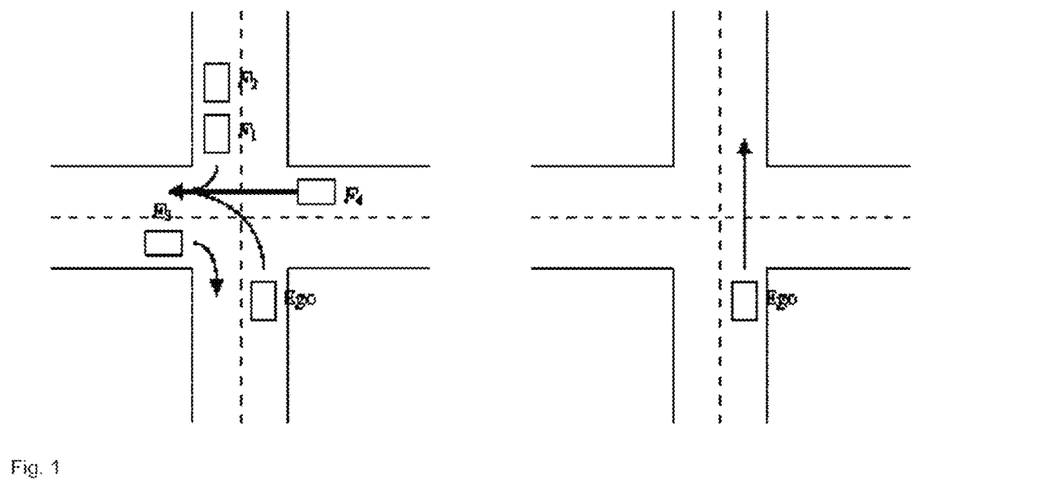
FIG. 1 is a schematic view of different traffic scenarios involving different driving maneuvers of an ego vehicle and varying numbers of fellow vehicles.

FIG. 1 is a schematic illustration of the differentiation of scenarios ($F_1$ to $F_n$) according to the invention. According to FIG. 1, the scenarios $F_1$ to $F_2$ may be entirely different in terms of the subset of their parameter set, or may have overlapping parameters, or may be identical in terms of the subset of their respective parameter sets. In a scenario-based test process of a driver assistance system, critical test cases are indicated by parameter combinations of specific driving situation parameters spanning a metric parameter space, said parameter combinations leading to critical driving situations, for example a vehicle collision or near-collision. Therefore, these parameter combinations have to be identified in a scenario.

The left-hand side of FIG. 1 illustrates a scenario, showing a turning maneuver and involving an ego vehicle, and four fellow vehicles. The right-hand side of FIG. 1 shows the same intersection area but without a turning maneuver and with just one ego vehicle.

FIG. 1 shows various scenarios that allow for different parameter combinations and also differing critical test cases.

Figure 2:
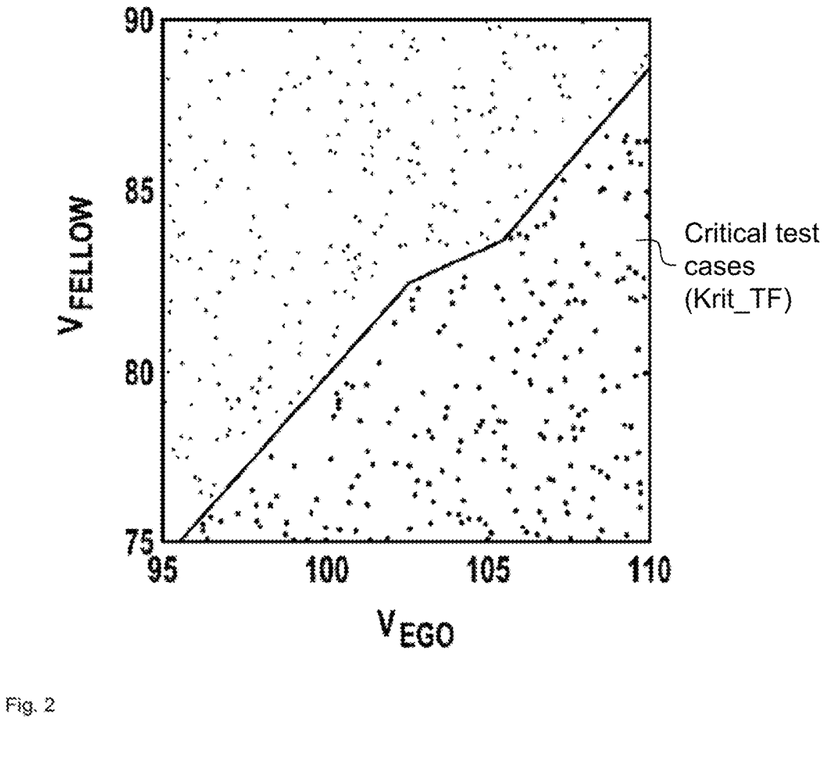
FIG. 2 is a schematic view indicating a boundary between critical and non-critical test results.

FIG. 2 shows, by way of example, the cutting-off scenario using the driving situation parameter $V_{EGO}$, i.e., a speed of the ego vehicle, and on the vertical axis $V_{FELLOW}$, i.e., the speed of the fellow vehicle driving in front.

The function illustrated in FIG. 2 forms the boundary between critical and non-critical test results (Krit_TF). The illustrated points are approximated test results. Alternatively, the illustrated points may be simulated test results, for example.

The illustrated rating function (BF) is a target safety function having a numerical value that has a minimum value at a safety distance between the motor vehicle and the other motor vehicle of $\geq V_{FELLOW} \times 0.55$, has a maximum value in the event of a collision between the motor vehicle and the other motor vehicle, and has a numerical value that is greater than the minimum value at a safety distance between the motor vehicle and the other motor vehicle of $\leq V_{FELLOW} \times 0.55$.

As an alternative to the target safety function, for example, a target comfort function or a target efficiency function can be approximated, which has a numerical value that has a minimum value when there is no change in the acceleration of the motor vehicle, has a maximum value in the event of a collision between the motor vehicle and the other motor vehicle, and has a numerical value between the minimum value and the maximum value if the acceleration of the motor vehicle changes, based on the magnitude of the acceleration change.

Figure 3:
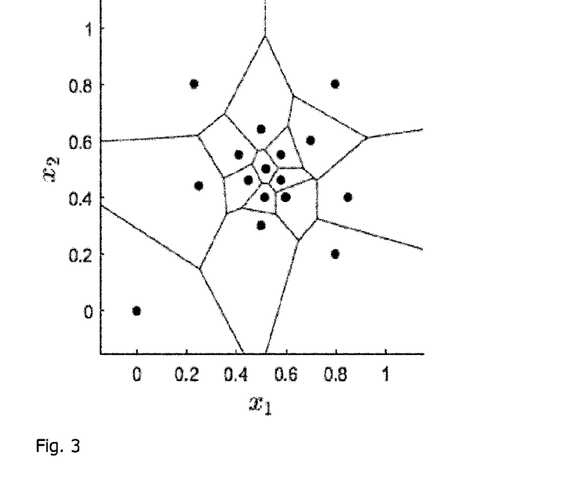
FIG. 3 shows a Voronoi diagram as an example of a design method.

FIG. 3 shows a Voronoi diagram as an example of a design method in the design phase (D). There are 16 points distributed in the definition range $X=[0,1]^2$. Each of the points is enclosed by the associated Voronoi cell. The cells are relatively smaller in areas having relatively more design points. In the drawing, this can be seen in the middle of the definition range. The design point $s=(0,0)$ is further away from the other points and has a larger Voronoi cell.

The sequential Voronoi design includes three steps:
Approximate the sizes of the Voronoi cells.
Distribute points at random in the largest Voronoi cell as candidates for new design points.
Select one of the candidates and add it to the design.

To save on time and computational power, the sizes of the cells are approximated in relation to the size of the definition range. A number of random points in the definition range are selected for this purpose. For each randomly selected point, the design point closest thereto is determined.

Each design point is allocated the number of random points that are closest to the design point. The size of a Voronoi cell belonging to a design point corresponds to the number of random points that are closest to the design point, divided by the total number of randomly selected points.

Next, points are distributed at random in the largest Voronoi cell, and, out of these, the point with the lowest minimum distance from all the other design points is selected. The design can also be implemented using a larger increment size. If an increment size $n_{new}$ is selected, one design point each is successively selected in the $n_{new}$ largest Voronoi cells.

Figure 4:
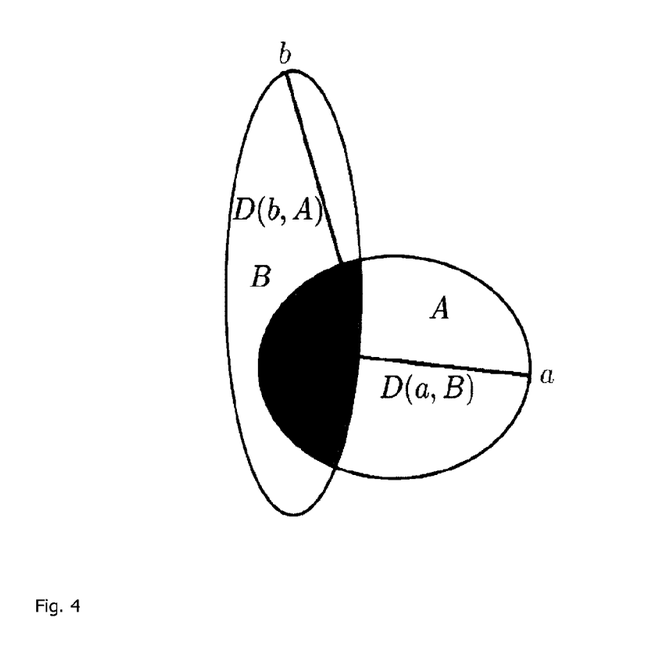
FIG. 4 schematically shows the determination of a Hausdorff distance.

FIG. 4 is a schematic illustration of the determination of a Hausdorff distance as an example of a distance metric (AM) between two sets. According to the invention, the Hausdorff distance between sets of critical test cases (Krit_TF), acting as the distance metric (AM), can be used as the abort condition.

Using the Hausdorff distance, a distance in the parameter space between a first set of critical test cases (Krit_TF, tn) in the iteration n and a second set of critical test cases (Krit_TF, tn−1) from the iteration n−1 or a predefined set of critical test cases (Krit_TF) is established, and the cycle (Z) of the test process (TP) is terminated or continued on the basis of the difference between the distance in the metric space between the first set and the second set and a preset limit.

For the Hausdorff distance, where (M, d) is a metric space and A, B $\subseteq$ M are non-empty compact subsets, then the Hausdorff distance between A and B is:

$$\delta(A,B) = \{\max\{D(a,B) | a \in A\}, \max\{D(A,b) | b \in B\}\}$$

FIG. 4 shows how the Hausdorff distance between two sets is produced. The drawing shows two compact subsets B and A. In the set A, the point a∈A that is the maximum distance D(a, B) from the set B is highlighted. The distance is marked by a black line. Analogously, in B, the point b & B the maximum distance D(A, b) away is highlighted. The Hausdorff distance between A and B results from (A,B) =max {D(a, B), D(A, b)}, the maximum over both paths.

Figure 5:
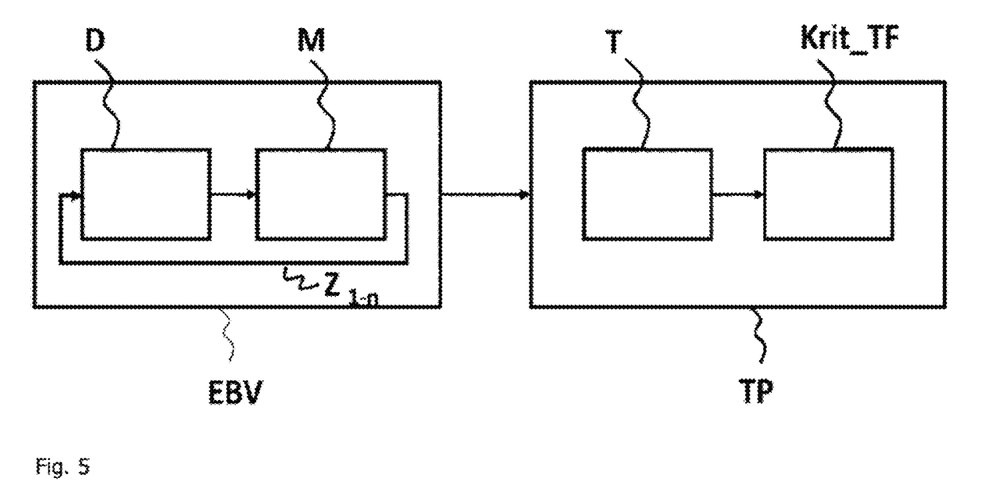
FIG. 5 is a schematic view of a conventional test method using a surrogate model.

FIG. 5 is a schematic view of a conventional test method using a surrogate model (EM). In this case, the surrogate model generation method (EBV) includes a design phase (D) and a model generation phase (M). Various methods or processes can be used in these phases, as described above. The aforementioned methods are not to be considered a definitive list. A cycle between the design phase (D) and the model generation phase (M) may be run 1 to n times, depending on the methods or abort criteria used. Once a surrogate model (EM) has been created by the surrogate model generation method (EBV), the test process (TP) can start using the surrogate model. As part of the test process (TP), tests (T) are carried out and evaluated while critical test cases (Krit_TF) are being identified. In conventional methods, there is no feedback between critical test cases (Krit_TF) and the creation of a surrogate model (EM).

Figure 6:
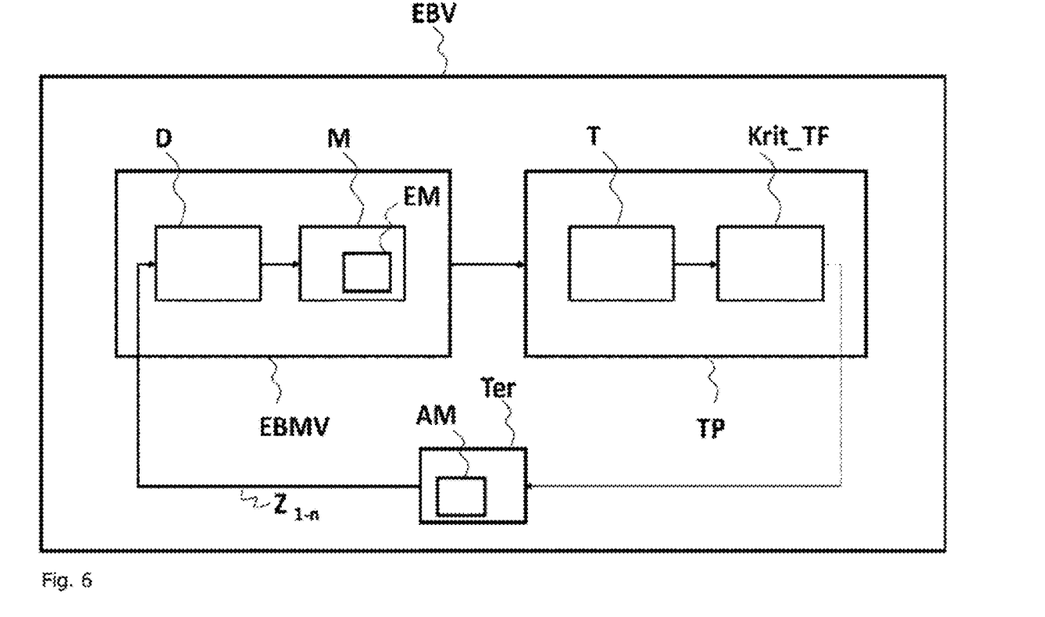
FIG. 6 is a schematic view of a test method according to the invention using a surrogate model.

FIG. 6 shows a computer-implemented method according to the invention. In this case, too, as shown in FIG. 6, a surrogate model (EM) is created by a method (EBMV) including a design phase (D) and a model generation phase (M). According to the invention, however, the surrogate model generation method (EBV) also encompasses the test process (TP). After each test (T) and once critical test cases (Krit_TF) have been determined, a termination (Ter) is checked on the basis of a distance metric (AM), for example the Hausdorff distance, in the parameter space between a first set of critical test cases (Krit_TF, tn) in the iteration n and a second set of critical test cases (Krit_TF, tn−1) from the iteration n−1 or a predefined set of critical test cases (Krit_TF). If the condition whereby the metric exceeds and/or drops below a preset limit is not met, a new cycle (Z) n+1 is started with the design phase (D).

Figure 7:
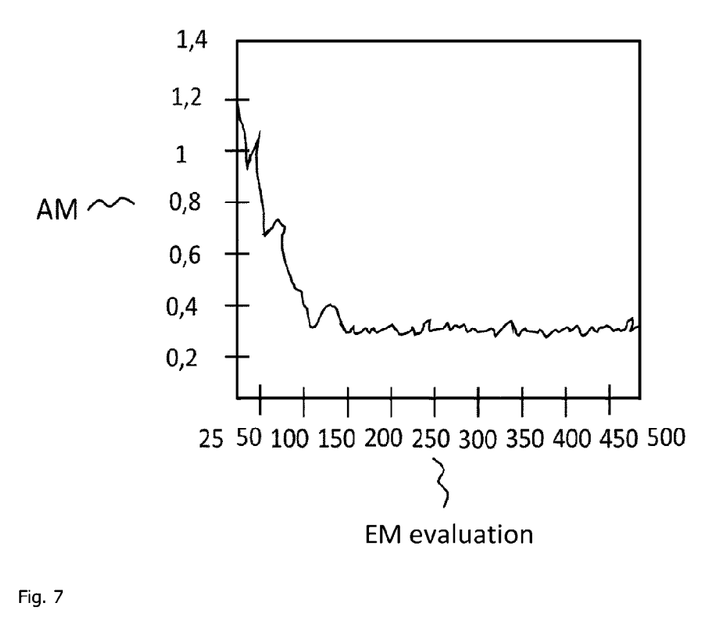
FIG. 7 is a schematic illustration of a progression of Hausdorff distances over a plurality of evaluations/simulations.

FIG. 7 is a schematic illustration of a progression of distance metrics (AM), using the example of the Hausdorff distance, over a plurality of evaluations/simulations. In this case, the Hausdorff distances are shown on the vertical axis in FIG. 7.

When looking at the surrogate model generation method (EBV) that uses a sequential design, in general a better surrogate model (EM) is generated as the number of design points increases. However, each new iteration requires more time and computational power. According to the invention, the method described in this patent specification can allow time and/or computational power to be reduced.

In the surrogate model generation method (EBV) according to the invention, a sequential design, for example LOLA-Voronoi, is preferably used in the design phase (D). The design method uses a starting design and determines new design points in each iteration. After each iteration, the scenario used is simulated and the relevant rating function (BF), for example a target safety function, is evaluated.

A termination (Ter) or abort condition is based on the Hausdorff distance between critical test cases (Krit_TF). Using this measure, a sequential surrogate model generation method (EBV) is aborted when the approximation of critical test cases (Krit_TF) does not change, or only changes slightly, in one step.

In the computer-implemented method according to the invention, the Hausdorff distances between two successive approximations of the critical test cases (Krit_TF) are observed. This is not yet possible in the first pass, and new points are added to the design by the sequential design. The comparison of pairs of Hausdorff distances between the approximations of the critical test cases (Krit_TF) can be determined with the second iteration.

FIG. 7 shows the evolution of the Hausdorff distances between iterations. If this value of the relevant Hausdorff distance is less than a preset limit, then the termination (Ter) or abort condition is satisfied. Otherwise, new design points are selected in the design phase (D), and the method is repeated until termination (Ter).

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A computer-implemented method for terminating a scenario-based test process of a driver assistance system, the method comprising:

performing a cycle of a test process, wherein the test process includes performing at least one test of the driver assistance system;

determining a set of critical test cases corresponding to the performed cycle, wherein respective critical test cases of the set correspond to respective parameter combinations of driving situation parameters spanning a metric parameter space;

determining a distance between the set of critical test cases and a previous set of critical test cases corresponding to a previous cycle of the test process, or determining a distance between the set of critical test cases and a predefined set of critical test cases;

determining whether to terminate the test process or to perform a subsequent cycle of the test process based on comparing the determined distance to a preset limit; and terminating the test process or performing the subsequent cycle of the test process based on the determination of whether to terminate the test process or to perform the subsequent cycle of the test process;

wherein the test process comprises an expanded surrogate model generation method, and wherein the cycle of the test process comprises a design phase, a model generation phase, and a test phase; and wherein the test process having the expanded surrogate model generation method is used to approximate rating functions of automated vehicles.

2. The method according to claim 1, wherein tests are performed by using a current surrogate model from a relevant iteration of the cycle.

3. The method according to claim 1, wherein a surrogate model is generated by the design phase and the model generation phase.

4. The method according to claim 1, wherein the determined distance is a Hausdorff distance.

5. The method according to claim 4, wherein a respective Hausdorff distance indicates a respective distance between two non-empty compact subsets in a metric space.

6. The method according to claim 1, wherein based on the determined distance being lower than the preset limit, the test process is terminated.

7. The method according to claim 1, wherein based on the difference between the determined distance being higher than the preset limit, the subsequent cycle of the test process is performed starting with a respective design phase.

8. The method according to claim 1, wherein quality of a surrogate model is determined based on a distance between sets of critical test cases.

9. The method according to claim 1, wherein a respective rating function includes at least a target safety function, a target comfort function, or a target efficiency function.

10. The method according to claim 1, wherein the test process having the expanded surrogate model generation method is performed in a real-world road test.

11. The method according to claim 1, wherein the test process having the expanded surrogate model generation method is performed using a test rig.

12. The method according to claim 1, wherein the test process having the expanded surrogate model generation method is performable using at least part of a vehicle.

13. The method according to claim 1, wherein the test process having the expanded surrogate model generation method is performed virtually.

14. A non-transitory computer-readable medium having processor-executable instructions stored thereon for terminating a scenario-based test process of a driver assistance system, wherein the processor-executable instructions, when executed, cause performance of the following:

performing a cycle of a test process, wherein the test process includes performing at least one test of the driver assistance system;

determining a set of critical test cases corresponding to the performed cycle, wherein respective critical test cases of the set correspond to respective parameter combinations of driving situation parameters spanning a metric parameter space;

determining a distance between the set of critical test cases and a previous set of critical test cases corresponding to a previous cycle of the test process, or determining a distance between the set of critical test cases and a predefined set of critical test cases;

determining whether to terminate the test process or to perform a subsequent cycle of the test process based on comparing the determined distance to a preset limit; and terminating the test process or performing the subsequent cycle of the test process based on the determination of whether to terminate the test process or to perform the subsequent cycle of the test process;

wherein the test process comprises an expanded surrogate model generation method, and wherein the cycle of the test process comprises a design phase, a model generation phase, and a test phase; and wherein the test process having the expanded surrogate model generation method is used to approximate rating functions of automated vehicles.

* * * * *